(No Model.)
T. HEAD.
POTATO HARVESTER.
No. 470,126. Patented Mar. 1, 1892.
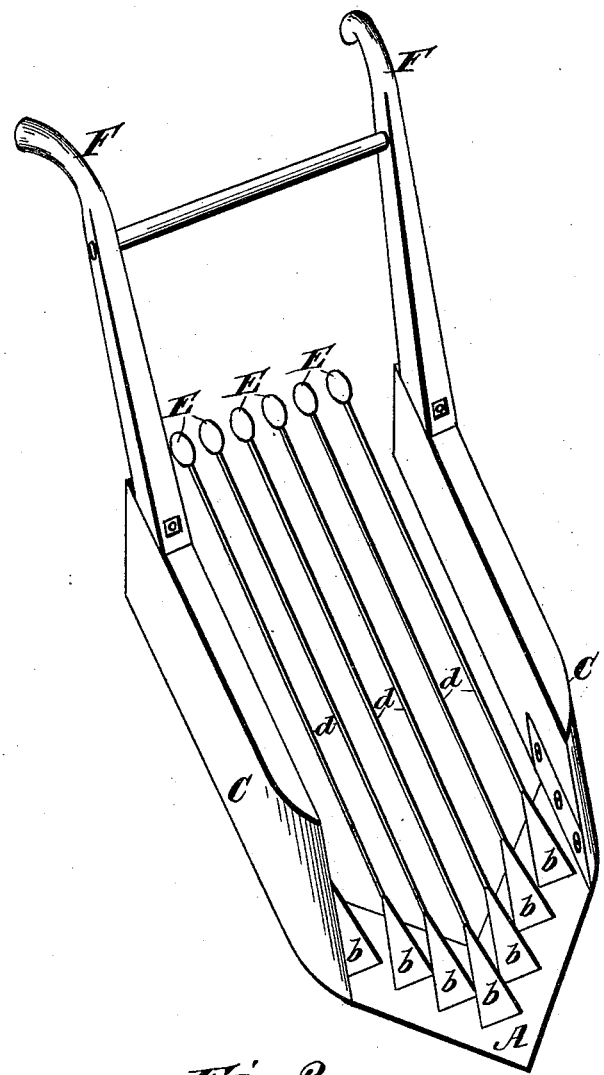
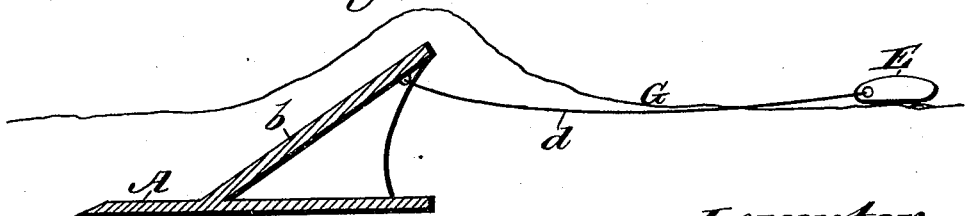
Witnesses.
Robert Everett.
J. A. Rutherford.
Inventor.
Thomas Head.
By James L. Norris.
Atty.

UNITED STATES PATENT OFFICE.

THOMAS HEAD, OF MANKATO, MINNESOTA.

POTATO-HARVESTER.

SPECIFICATION forming part of Letters Patent No. 470,126, dated March 1, 1892.

Application filed December 29, 1890. Serial No. 376,181. (No model.)

*To all whom it may concern:*

Be it known that I, THOMAS HEAD, a citizen of the United States, residing at Mankato, in the county of Blue Earth and State of Minnesota, have invented a new and useful Machine for Harvesting Potatoes, of which the following is a specification.

My invention relates to potato harvesters or diggers, and has for its object to provide an improved implement which shall be thoroughly effective in performing its work; and to this end the invention consists in the novel construction, combination, and arrangement of parts, hereinafter described and claimed, reference being had to the accompanying drawings, in which—

Figure 1 is a perspective view of a potato harvester or digger embodying my invention, and Fig. 2 is a vertical section thereof.

In the said drawings, the reference-letter A designates a pointed share which is attached to the forward under edges of the side shoes or guides C. These shoes or guides reach to the bottom of the furrow, in which they slide, confining and guiding the potatoes between them. To the rear end of these shoes or guides C C are secured the handles F F for steadying and guiding the machine during its operation. Rigidly attached to and projecting upward and backward from the share are triangular-shaped flat-surfaced teeth $b$, disposed with their broader ends pointing to the front of the share and the planes of their faces parallel, as shown in Fig. 1 of the drawings. Connected to the rear ends of these teeth $b$ are wires $d$, extending rearwardly to and preferably past the rear ends of the shoes or guides C.

The reference-letters E designate floats secured to the rear ends of the wires $d$, which serve to keep the rear ends of the wires above the surface of the earth traversed. If desired, I may use a cross-chain to connect the rear ends of the wires $d$ together or I may employ such a cross-chain to connect the several floats. When such a cross-chain is used, the entire series of wires may be lifted simultaneously when turning the harvester or digger around.

In potato-diggers heretofore in use the teeth have not been disposed upon the share in the same manner as in my invention. Further, in former potato-diggers the wires for separating the potatoes from the earth have been attached to the share proper and not directly to the teeth, as in my invention.

By means of the peculiar shape and arrangement of the teeth shown by the accompanying drawings, the row of potatoes and earth is broken up and elevated onto the wires, and the wires being attached directly to the teeth on the share instead of to the share proper form a bag-like screen behind the teeth and forming a continuation thereof, which screen will travel over the furrow-space, and the finer earth will sift through the wires and drop into such furrow-space. The coarser earth which is carried onto the wires with the potatoes is gradually pulverized by the cutting action of the wires as the machine passes along and the floats by keeping the rear ends of the wires above the surface of the ground operate to elevate the potatoes through the pulverized earth to the surface and permit them to roll over the floats by the forward movement of the machine.

In Fig. 2 I have shown my improved implement in operation, and in this figure the wave-line designates the surface of the earth in which the machine is working.

Having thus described my invention, what I claim is—

In a potato harvester or digger, the combination, with a share having side shoes or guides, of triangular-shaped teeth arranged on said shoes with their broader ends pointing to the front of said share, wires connected to the rear ends of said teeth, and means attached to the rear ends of said wires to keep such ends above the surface of the ground.

THOMAS HEAD.

Witnesses:
 HENRY C. GERLACH,
 ED. SCHILDKNECHT.